(12) United States Patent
Karppanen

(10) Patent No.: US 10,242,119 B1
(45) Date of Patent: Mar. 26, 2019

(54) SYSTEMS AND METHODS FOR DISPLAYING WEB CONTENT

(71) Applicant: Amazon Technologies, Inc., Seattle, WA (US)

(72) Inventor: Jari Juhani Karppanen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 148 days.

(21) Appl. No.: 14/867,638

(22) Filed: Sep. 28, 2015

(51) Int. Cl.
*G06F 17/30* (2006.01)
*G06T 11/60* (2006.01)
*G06T 1/60* (2006.01)

(52) U.S. Cl.
CPC .......... *G06F 17/30893* (2013.01); *G06T 1/60* (2013.01); *G06T 11/60* (2013.01)

(58) Field of Classification Search
CPC .... G06F 17/30893; G06F 15/167; G06T 1/60
See application file for complete search history.

(56) References Cited

U.S. PATENT DOCUMENTS

| | | | | |
|---|---|---|---|---|
| 6,104,416 A * | 8/2000 | McGuinness | ...... | H04N 21/4143 345/544 |
| 2005/0036160 A1* | 2/2005 | Goto | ........................ | G06T 5/40 358/1.9 |
| 2008/0181498 A1* | 7/2008 | Swenson | ................... | G09G 5/14 382/173 |
| 2015/0062171 A1* | 3/2015 | Cho | ........................ | G09G 5/397 345/634 |
| 2015/0113513 A1* | 4/2015 | Aggag | ...................... | G06F 8/48 717/140 |

\* cited by examiner

*Primary Examiner* — Manglesh M Patel
*Assistant Examiner* — Nicholas Hasty
(74) *Attorney, Agent, or Firm* — Eversheds Sutherland (US) LLP

(57) ABSTRACT

Provided are systems and methods for displaying web content. An example method includes receiving web content comprising an area to be displayed, segmenting the area into tile areas, generating raw tiles corresponding to the tile areas, storing the raw tiles in a first memory space allocated for storing raw tiles, encoding the raw tiles to generate encoded tiles corresponding to the tile areas, storing the encoded tiles in a second memory space allocated for storing encoded tiles, releasing the portion of the memory space storing the raw tiles, combining two or more of the encoded tiles to generate combined tiles, storing the combined tiles in a third memory space allocated for storing combined tiles, releasing the portion of the second memory space storing the encoded tiles, combining two or more of the combined tiles to generate an image, storing the image in a fourth memory space, and releasing the portion of the third memory space storing the combined tiles.

24 Claims, 5 Drawing Sheets

SYSTEMS AND METHODS FOR DISPLAYING WEB CONTENT

BACKGROUND

The World Wide Web (also referred to as the "web") is an information system of interlinked documents that are accessible via the Internet. Users can access document pages (also referred to as "web pages") using a web browser or a similar application running on user devices. A website typically refers to a set of related web pages, often hosted by one or more web servers. In some instances, web pages can include large amounts of information that can increase the time that it takes to load and display a web page. For example, a web page can include large images that can take a relatively long time to process and display, and this can create a noticeable delay when loading or scrolling through a web page.

Figure 1:
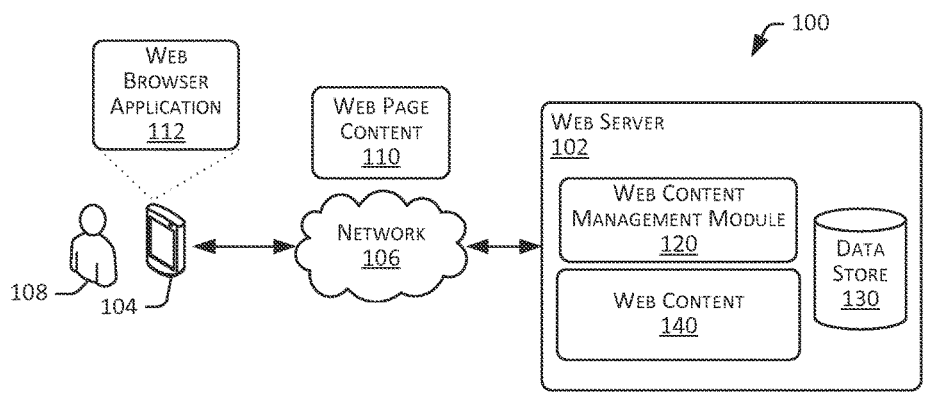
FIG. 1 is a diagram that illustrates an example content distribution environment in accordance with one or more embodiments.

While this disclosure is susceptible to various modifications and alternative forms, specific embodiments thereof are shown by way of example in the drawings and will be described in detail herein. The drawings may not be to scale. It should be understood, however, that the drawings and the detailed descriptions thereto are not intended to limit the disclosure to the particular form disclosed, but, to the contrary, the intention is to cover all modifications, equivalents, and alternatives falling within the spirit and scope of the present disclosure as defined by the appended claims.

DETAILED DESCRIPTION

Described herein are systems and methods for processing and displaying web content. Content on the World Wide Web can be referred to as "web content". Web content can include, for example, websites and web pages accessible via the Internet. In some instances, a web page can include one or more images that are displayed, for example, in a web browser application used to view the web page. In some embodiments, processing a web page for display can include segmenting or splitting the web page into multiple tiles, processing the tiles individually to generate encoded tiles, and combining the encoded tiles to generate one or more images for the web page. As a user scrolls through a web page using a browser application, for example, one or more of the images corresponding to the area of the web page currently being viewed can be loaded and displayed by the browser application.

In some embodiments, processing a web page for display can include receiving web page content that includes an area of a web page to be displayed, segmenting the web page content into small tile areas, identifying layers of the web page content for each of the respective small tile areas, merging the layers of the respective small tile areas to generate corresponding raw-small tiles, encoding the raw-small tiles to generate corresponding encoded-small tiles, combining the encoded-small tiles of the respective large tile areas to generate encoded-large tiles, and combining one or more of the encoded-large tiles to generate a web page image.

In some embodiments, processing the web page for display can include allocating a first memory space for storing raw-small tiles, allocating a second memory space for storing encoded-small tiles, and/or allocating a third memory space for storing encoded-large tiles. In such an embodiment, the generated raw-small tiles can be stored in the first memory space. The generated raw-small tiles can be retrieved from the first memory for use in generating the encoded-small tiles, and the encoded-small tiles can be stored in the second memory space. When an encoded-small tile is generated and/or stored in the second memory space, the portion of the first memory space storing the corresponding raw-small tile can be released (e.g., returned to a memory "pool", such as total memory, for use in storing subsequently generated raw-small tiles). The generated encoded-small tiles can be retrieved from the second memory for use in generating the encoded-large tiles, and the generated large tiles can be stored in the third memory space. When an encoded-large tile is generated and/or stored in the third memory space, the portion of the second memory space storing the corresponding encoded-small tile can be released (e.g., returned to a memory "pool", such as total memory, for use in storing subsequently generated encoded-small tiles). In some embodiments, the encoded-large tiles can be combined into a web page image that is transferred to another memory space (e.g., a fourth memory space), such as input/output memory allocated for storing the overall web page content. When an encoded-large tile is combined into a web page image and/or is transferred (e.g., to the fourth memory space), the portion of the third memory space storing the corresponding encoded-large tile can be released (e.g., returned to a memory "pool", such as total memory, for use in storing subsequently generated encoded-large tiles). Thus, the encoded-large tiles can be combined to generate an image for the web page that is stored in the fourth memory space. Such use of allocated memory spaces can concurrently operate on multiple raw-small tiles, encoded-small tiles, and/or encoded-large tiles in parallel, providing for relatively efficient processing of a web page.

In some embodiments, the first, second, third, and/or fourth memory spaces can be part of a total memory allocation to the system. As needed, portions of the first, second, third, and fourth memory spaces can be allocated, used, released, and/or reused by the system as needed. Release of some or all of the memory spaces for reuse can be delayed as needed to await the completion of one or more other processes or the release of certain resources for other processing. In some embodiments, the first, second, and/or third allocated memory spaces can include a non-persistent memory space, and a fourth memory space can include a persistent memory. Both the non-persistent memory space and persistent memory may be part of a total memory available to a user device, server device, or computing resource. Non-persistent memory may include memory that is available to one or more processes while they are executing, but that is repurposed (e.g., released, cleared, and/or allocated for use or reuse by another process) when the one or more processes are complete or at least no longer need the data stored in the memory space. Persistent memory may include memory that is available to one or more processes while they are executing, and that is not repurposed (e.g., released, cleared, and/or allocated for use or reuse by another process) when the one or more processes are complete or at least no longer need the data stored in the memory space. Persistent memory may include non-volatile memory, and non-persistent memory may include volatile memory. For example, the first, second, and third allocated memory spaces can include respective portions of random access memory (RAM) and/or the like that can be used by one or more processes, and the fourth allocated memory space can include a portion of the system memory (e.g., a hard drive, RAM, and/or the like) that continues to store some or all of the encoded-large tiles and/or a corresponding image for the web page, even after the one or more processes generating the encoded-large tiles and/or a corresponding image for the web page from the web content are complete. Such use of persistent memory can enable the encoded-large tiles and/or a corresponding image for the web page to remain in storage for use by other processes and/or applications, such as for use by a web browser application to display the web page.

In some embodiments, the tile areas can be of any suitable shape and/or size. For example, the tile areas can be square, rectangular, and/or the like. In some embodiments, the size of the tile areas is based at least in part on one or more characteristics of the encoding technique being used. For example, if the encoding process is configured to process images of a size of about 10×20 pixels, then the tile areas can be sized to be an increment of that size. That is, for example, the large and/or small tile areas can be 10×20 pixels, 20×20 pixels, 50×200 pixels, and/or the like. In some embodiments, the tile areas can be of the same or different shapes and/or sizes. For example, if the web page area is about 10,000×16,000 pixels in size, the web page area can be segmented into 8 rectangular 5,000×4,000 pixel large tile areas, and each of the large tile areas can be further split into small tile areas of different shapes and sizes (e.g., small tile areas of 10×20 pixels, 20×20 pixels, 50×200 pixels, and/or the like). In some embodiments, the size and/or shape of a tile area can be based on the content of the tile area. For example, a portion of a page area that includes a relatively complex and/or large amount of content (e.g., multiple graphics, text, and/or the like) may be split into more or smaller tile areas, whereas a portion of a page area that includes a relatively simple and/or small amount of content (e.g., white space with only a few lines of text, and/or the like) may be split into less or larger tile areas. This can help to balance the processing needed to generate the encoded tiles for those areas. In some embodiments, the size and the shape of a tile area (large or small) can be selected based on a predetermined amount of processing and/or an expected amount of processing needed for the area. For example, if the tiles are expected to be processed in about 3 ms (milliseconds), then a tile area shape and size can be defined to encapsulate a portion of a page area that includes features that are expected to take about 3 ms to process. In a page area that includes primarily white space with few graphics or limited text, a tile area may be defined that is about 200×200 pixels (e.g., encompassing a relatively large area expected to take about 3 ms to process). In a page area that includes multiple complex graphics and image layers, a tile area may be defined that is about 10×20 pixels (e.g., encompassing a relatively small area expected to take about 3 ms to process).

In some embodiments, the size of one or more of the allocated memory spaces can be determined based on the size of one or more of the other allocated memory spaces. For example, in many instances, encoding an image can reduce the size of the image and, thus, the size of the second memory space (for storing encoded-small tiles) may be smaller than the size of the first memory space (for storing raw-small tiles). In some embodiments, the relative size of the allocated memory space can be determined based on a predetermined ratio. For example, if about 1 MB (megabyte) of memory is allocated for the first memory space and the encoding to be used is determined to reduce images size by about 10% on average, then about 0.9 MB (megabyte) of memory may be allocated for the second memory space. In some embodiments, the size of the third memory space (for storing encoded-large tiles) can be about the same as the size of the second memory space (for storing encoded-small tiles).

Although certain embodiments are described with regard to web pages, web page content, web page images, and web browsers for the purpose of illustration, similar embodiments can be employed in other contexts. For example, embodiments similar to that described herein can be used for processing and displaying images in any variety of applications, such as a document or image viewing application. Moreover, although certain embodiments are described with regard to operations being performed by a given entity, such as a web browser of a user device, similar embodiments can be employed by any number or combination of suitable devices. For example, in a distributed web browsing system (e.g., in which some processing is off-loaded to a web server or other remote device), some or all of the operations described herein can be executed on a user device, and/or some or all of the operations described herein can be executed on a remote device (e.g., a web server).

FIG. 1 is a diagram that illustrates an example web content distribution environment ("environment") 100 in accordance with one or more embodiments. The environment 100 may include a web server 102, and/or one or more user devices (or client devices) 104 communicatively coupled via a communications network 106. As described herein, the user devices 104 may be used by (or otherwise associated with) one or more users 108. Moreover, the web server 102 may serve web page content 110 to be rendered for display on the user device 104 for viewing by the user 108.

The network 106 may include an element or system that facilitates communication between the entities of the environment 100. For example, the network 106 may include an electronic communications network, such as the Internet, a local area network (LAN), a wide area network (WAN), a wireless local area network (WLAN), a cellular communications network, and/or the like. In some embodiments, the network 106 can include a single network or a combination of networks.

The user device 104 may include any variety of electronic devices, such as one or more electronic computing devices. The user device 104 may include, for example, a desktop computer, and/or one or more mobile computing devices, such as an electronic reader (e-reader), a laptop computer, a tablet computer, a personal digital assistant (PDA), a smartphone, a wearable computer device (e.g., a smart watch), a gaming console, and/or the like. In some embodiments, the user device 104 can include a networked device capable of communicating information via the network 106. The user device 104 may be a client of the web server 102. In some embodiments, the user device 104 may include various input/output (I/O) interfaces, such as a display screen (e.g., for displaying graphical user interfaces (GUIs)), an audible output interface (e.g., a speaker), an audible input interface (e.g., a microphone), an image acquisition interface (e.g., a camera), a biometric interface (e.g., an eye or fingerprint scanner), a keyboard, a pointer/selection device (e.g., a mouse, a trackball, a touchpad, a touchscreen, a stylus, or the like), a gesture capture or detection device, a printer, and/or the like.

In some embodiments, the user device 104 can include general computing components and/or embedded systems optimized with specific components for performing specific tasks. The user device 104 may include, for example, a web browser application 112 (also referred to herein as a "browser application" or a "browser"). The browser application 112 may be a software application that is executed by the user device 104 for retrieving, presenting, and/or traversing information resources on the web. For example, a user 108 may interact with a browser application 112 on the user device 104 to navigate to different websites and web pages available on the web. In some embodiments, the browser application 112 can provide for processing and displaying web pages as described herein. For example, the browser application 112 can receive web page content that includes content for an area of a web page to be displayed on the user device 104, segment the area of the web page into large tile areas, split the large tile areas into small tile areas, identify layers of the web page content for each of the respective small tile areas, merge the layers of the respective small tile areas to generate corresponding raw-small tiles, encode the raw-small tiles to generate corresponding encoded-small tiles, and combine the encoded-small tiles of the respective large tile areas to generate encoded-large tiles. Moreover, the browser application 112 can provide for display of the encoded-large tiles individually or in combination to provide for display of some or all of the web page. For example, if a user is attempting to view a first upper portion of a web page that includes an area covered by a first and a second large tile, then the browser application 112 can retrieve the first and the second large tiles and use them to populate the viewport of the web browser. If the user then scrolls down to view a second lower portion of the web page that includes an area covered by the second large tile and a third large tile, the web browser can retrieve the second and the third large tiles and use them to populate the displayed viewport of the browser application 112. In some embodiments, the browser application 112 can also provide for allocating and using a first memory space for storing raw-small tiles, allocating and using a second memory space for storing encoded-small tiles, and allocating and using a third memory space for storing encoded-large tiles.

In some embodiments, the programs or applications of the user device 104, such as the browser application 112, can include modules having program instructions that are executable by a computer system to perform some or all of the functionality described herein with regard to the user device 104. In some embodiments, the user device 104 can include one or more computer systems similar to that of the computer system 1000 described below with regard to at least FIG. 6.

The web server 102 may include an electronic computing device having network connectivity and being capable of providing one or more services to network clients, such as the user device 104. These services may include receiving, processing, storing, and/or serving or otherwise providing data, such as serving web page content 110 and related information to one or more user devices 104. In some embodiments, the web server 102 can include a web content management module 120. As described herein, the web content management module 120 may be executable to cause the web server 102 to perform some or all of the operations described herein as being performed by the web server 102. Although certain embodiments are described with regard to a single server for the purpose of illustration, embodiments may include employing multiple servers, such as a plurality of distributed web servers. In some embodiments, the web server 102 can include one or more computer systems similar to that of the computer system 1000 described below with regard to at least FIG. 6.

In some embodiments, the web server 102 can include or otherwise have access to a data store 130. The data store 130 may include a non-transitory computer-readable medium for storing data thereon. The data store 130 may store, for example, the web content management module 120, the web content 140, and/or the like. Although certain embodiments are described with regard to a single data store 130 for the purpose of illustration, embodiments may include employing multiple data stores 130, such as a plurality of distributed data stores 130. The web content 140 can include web content that can be served to a user device 104 for presentation to a user 108. For example, the web content 140 may include the web page content 110 for one or more web pages or one or more websites hosted by the web server 102.

Figure 2:
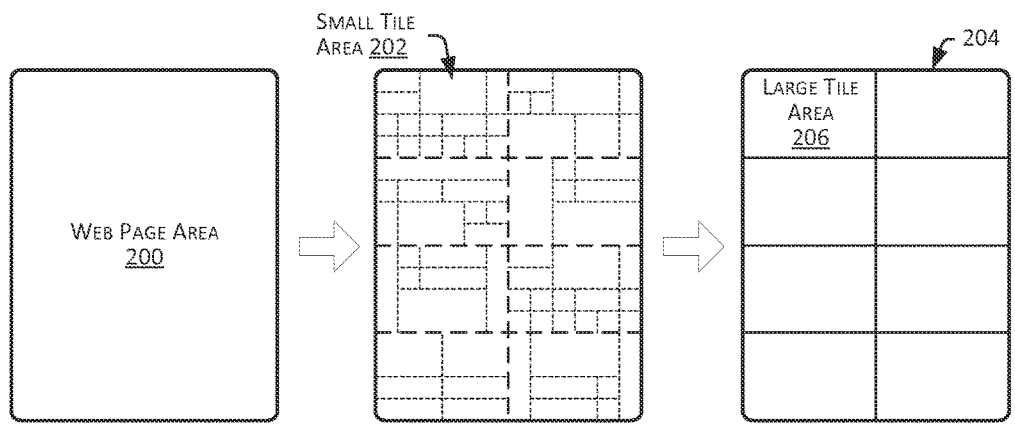
FIG. 2 is a diagram that illustrates an example process for segmenting a web page area into tiles and generating a web page image using the tiles in accordance with one or more embodiments.

FIG. 2 is a diagram that illustrates an example process for segmenting (or splitting) a web page area 200 into tiles 202 and generating a web page image 204 using the tiles 202 in accordance with one or more embodiments. As described herein, the process illustrates an example in which a web page area 200 is segmented (or split) into multiple small tile areas 202. For example, the web page area 200 is segmented into 71 different sized small tile areas 202. In an example embodiment, the web page area 200 may be about 10,000× 16,000 pixels in size, the 71 small tile areas 202 may each be of different shapes and sizes (e.g., 10×20 pixels, 20×20 pixels, 50×200 pixels, 5,000×4,000 pixels and/or the like). Each of the small tiles 202 of the web page area can be used to generate the web page image 204 by assembling multiple large tile areas 206, which may be different sized from each other.

Figure 3:
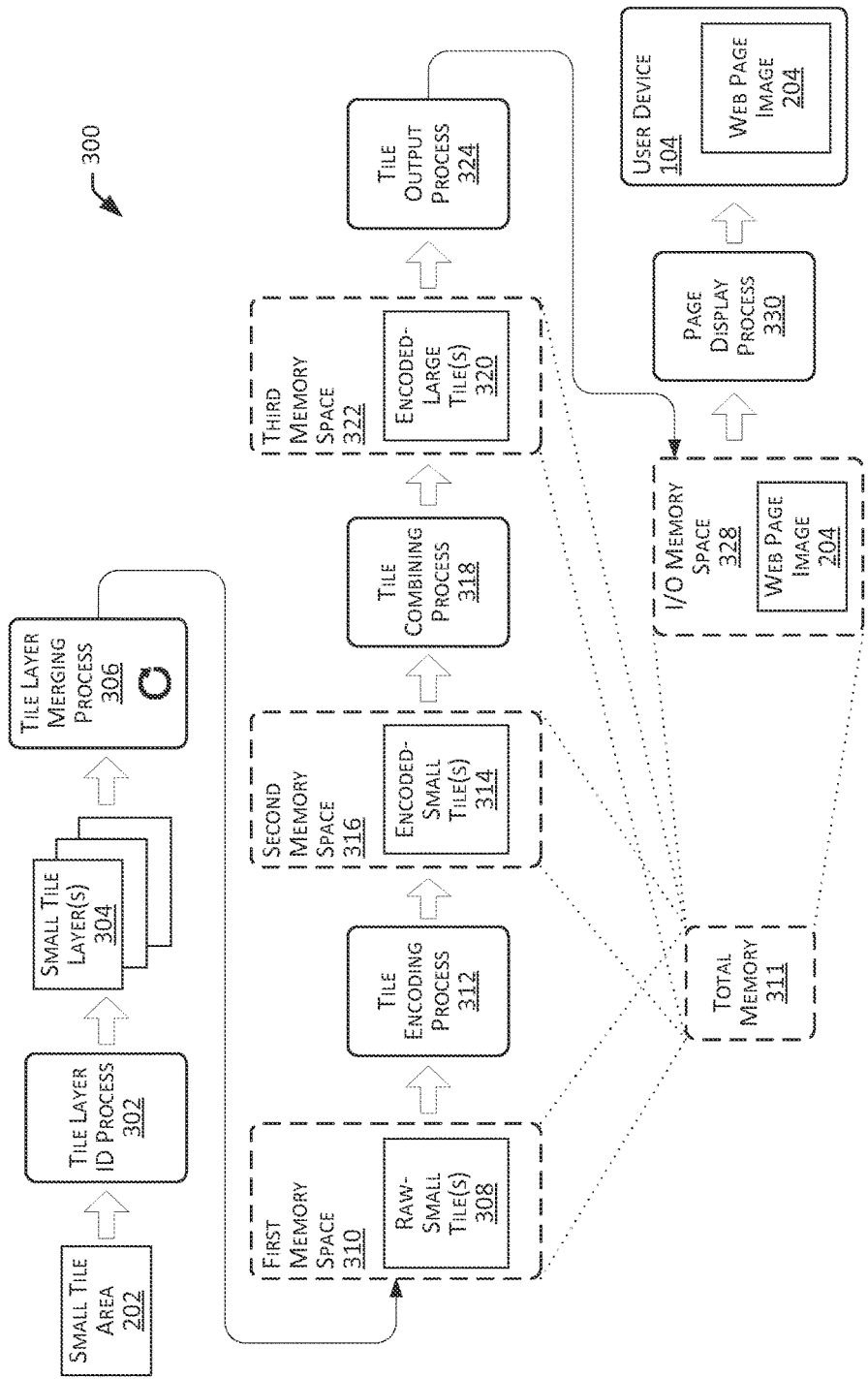
FIG. 3 is a diagram that illustrates an example process for rendering a web page in accordance with one or more embodiments.

FIG. 3 is a diagram that illustrates an example process 300 for rendering a web page in accordance with one or more embodiments. In some embodiments, one or more small tile areas, such as 202 in FIG. 2, can be selected. In some embodiments, the number and location of the small tile areas 202 can be selected based on the processing resources available and/or a location within the web page area, such as 200 in FIG. 2. For example, a rendering process may be configured to process about 20 small tile areas 202 in parallel and/or may select those that are in or near a viewing area of the web page area 200 (e.g., in or near the portion of the web page area 200 that is to be displayed to the user, such as 108 in FIG. 1, in a viewport of the browser application, such as 112 in FIG. 1, of the user device 104 in FIG. 1). In such an embodiment, if the browser application 112 viewport includes the web page area, such as 200 in FIG. 2, then 20 small tile areas 202 of the web page area 200 may be selected (e.g., the 15 small tile areas 202 of the left upper most portion of the web page area 200, and 5 of the 8 small tile areas 202 of the right upper most portion of the web page area 200 may be selected). In some embodiments, each of the small tile areas 202 can be processed in parallel with the processing of the other small tile areas 202 currently selected.

In some embodiments, a tile layer identification process 302 can be executed to identify one or more layers of each of the selected small tile areas 202. This can include, for example, identifying, for each of the selected small tile areas 202, background layers, transparent layers, layers of graphics, layer of text, and/or the like that are present in the small tile area 202 (e.g., that are contained in or at least overlap partially within the small tile area 202), and/or an order thereof (e.g., which layer is the first (background layer), which layer is the next layer, and so forth until the last (foreground layer)). In some embodiments, the tile layer identification process 302 can include processing some or all of the small tile areas 202 in parallel.

In some embodiments, a tile layer merging process 306 can be executed to merge the small tile layers 304 of the respective small tile areas 202 to generate corresponding raw-small tiles 308. This can include, for example, for each of the selected small tile areas 202, merging the layers identified as being present in the small tile area 202 to generate a corresponding raw-small tile 308. If, for example, a small tile area 202 includes a background layer (e.g., including a first graphic), an intermediate layer (e.g., including a second graphic), and a foreground layer (e.g., including text), then the three layers can be merged to generate a corresponding raw-small tile 308 that includes the second graphic overlaid on top of the first graphic and the text overlaid on the first and second graphics. In some embodiments, a first memory space 310 (e.g., in non-persistent memory), which can be a portion of a total memory 311, can be allocated for storing the raw-small tiles 308, and the raw-small tiles 308 can be stored in the first memory space 310 as they are generated. In some embodiments, the tile layer merging process 306 can include processing some or all of the small tile areas 202 in parallel. For example, 20 threads handling the receptive tile layer merging process 306 for the 20 small tile areas 202 can be executed in parallel. When a thread completes the merging of the small tile layers 304 to generate a raw-small tile 308 corresponding to the small tile area 202, it may store the raw-small tile 308 in the first memory space 310 and, then, proceed with executing a tile layer merging process 306 for another small tile area 202 (e.g., the first of the 20 threads to complete may proceed with processing the $21^{st}$ small tile area 202, the second of the 20 threads to complete may proceed with processing the $22^{nd}$ small tile area 202, and so forth). Furthermore, in some embodiments, the tile layer merging process 306 can be repeated as many times as necessary to process some or all of the small tile layers 304 of the respective small tile areas 202 to generate corresponding raw-small tiles 308.

In some embodiments, a tile layer merging process 306 can use a dependency graph to determine an order to generate the raw-small tiles 308. For example, a dependency graph can illustrate or otherwise describe one or more relationships such as a parent-child layer order, usage of common input resources (e.g., when using the same JPEG image, the resource can be kept in memory a relatively short time if all dependent tiles are processed at about the same time), and/or spatial dependency. In certain instances, partially completed tiles can be kept waiting while other tiles are being processed, before merging another layer of content to the partially completed tiles.

In some embodiments, a tile layer merging process 306 can be executed to track coincidental memory consumption and to allocate memory from the first memory space 310. For example, memory for items such as temporary font glyph buffers can be allocated from the first memory space 310, and the corresponding memory consumption can be tracked. In certain embodiments, tracking can be based at least in part on memory consumption estimates and/or performed indirectly by, for instance, monitoring free heap size. Actual reservation of memory can be managed as needed by the process 306. In certain instances, allocations and/or reservations from the first memory space 310 can be artificially limited to compensate for and to avoid exceeding a total memory size or limit.

In some embodiments, a tile encoding process 312 can be executed to encode the raw-small tiles 308 to generate corresponding encoded-small tiles 314. This can include, for example, for each of the raw-small tiles 308, executing an encoding algorithm to generate a corresponding encoded-small tile 314. In some embodiments, a second memory space 316 (e.g., in non-persistent memory), which can be another portion of the total memory 311, can be allocated for storing the encoded-small tiles 314, and the encoded-small tiles 314 can be stored in the second memory space 316 as they are generated. In some embodiments, the tile encoding process 312 can include processing some or all of the raw-small tiles 308 in parallel. For example, 15 threads handling the receptive tile layer merging process 306 for the raw-small tiles 308 stored in the first memory space 310 can be executed in parallel. Each thread may retrieve a raw-small tile 308 from the first memory space 310, encode the raw-small tile 308 to generate an encoded-small tile 314 corresponding to the raw-small tile 308 (and a corresponding the small tile area 202), store the encoded-small tile 314 in the second memory space 316, release the portion of the first memory space 310 storing the raw-small tile 308 and, then, proceed with executing a tile encoding process 312 for another raw-small tile area 308 stored in the first memory space 310 (e.g., the first of the 15 threads to complete may proceed with processing the $16^{th}$ raw-small tile 308 stored in the first memory space 310, the second of the 15 threads to complete may proceed with processing the $17^{th}$ raw-small tile 308 stored in the first memory space 310, and so forth).

In some embodiments, a tile encoding process 312 can generate multiple layers of large tiles when larger number of layers of small tiles are merged to equal or smaller (but greater than 1) number of output layers. For example, if an interactive screenshot is generated of a page with a static background and scrollable content floating on the background, there can be two output images. In any instance, the output images may not have the same dimensions (e.g., the background layer can be smaller if it moves slower or not at all when scrolling the topmost layer). Layer Z order and parent layer attributes can be used to decide whether to generate a layer as independent output, or whether to merge just the visible area of a scrollable child layer into its parent layer. Each tile can have a layer identifier, such as a relatively small integer, along with an X coordinate, Y coordinate, and width and height information.

In some embodiments, a tile encoding process 312 can use a shared color palette and/or encoding dictionary to encode one or more raw-small tiles 308. In such instances, subtle color differences between tile areas may be avoided by using or otherwise accessing a shared color palette and/or encoding dictionary.

In some embodiments, a tile combining process 318 can be executed to combine one or more of the encoded-small tiles 314 to generate corresponding encoded-large tiles 320. This can include, for example, for each of the large tile areas 206, identifying some or all of the encoded-small tiles 314 stored in the second memory space 316 that are contained in the large tile area 206, and executing the combining process 318 to combine the identified encoded-small tiles 314 to generate some or all the corresponding encoded-large tiles 320 for the large tile area 206. In some embodiments, a third memory space 322 (e.g., in non-persistent memory), which can be yet another portion of the total memory 311, can be allocated for storing the encoded-large tiles 320, and the encoded-large tiles 320 can be stored in the third memory space 322 as they are generated. In some embodiments, the tile combining process 318 can include combining encoded-small tiles 314 for some or all of the encoded-large tiles 320 in parallel. For example, 4 threads handling the tile combining processes 318 for the 8 large tile areas 206 can be executed in parallel. Each thread for a large tile area 206 may retrieve encoded-small tiles 314 corresponding to a small tile area 202 that falls within the large tile area 206 from the first memory space 310, combine the encoded-small tiles 314 to generate an encoded-large tile 320 corresponding to the large tile area 206, store the encoded-large tile 320 in the third memory space 322, release the portion of the second memory space 316 storing the encoded-small tiles 314 that were combined and, then, proceed with executing a tile combining process 318 for another large tile area 206 (e.g., the first of the 4 threads to complete may proceed with processing to combine the encoded-small tiles 314 for the $5^{th}$ large tile area 206, the second of the 4 threads to complete may proceed with processing to combine the encoded-small tiles 314 for the $6^{th}$ large tile area 206, and so forth).

In some embodiments, a tile combining process 318 can be executed to allocate memory for a single large tile based at least in part on an estimate calculated from a combination of the size of a first incoming tile (which may be any of the needed tiles) and one or more statistics associated with tile space requirements. In certain instances, size can be overestimated to reduce a likelihood for needing to move data into a relatively larger memory space or buffer. In this manner, memory space for encoded-small tiles can be released once the encoded-small tiles are received.

In some embodiments, a tile output process 324 can be executed to combine one or more of the encoded-large tiles 320 to generate at least a portion of a web page image 204 for some or all of the web page area 200. This can include, for example, when some or all of the encoded-large tiles 320 for the web page area 200 are complete, combining some or all of the completed encoded-large tiles 320 to generate an image for the corresponding portions of the web page area 200. For example, if the 8 encoded-large tiles 320 for the 8 large tile areas 206 of the web page area 200 are completed (see FIG. 2), a thread may combine the 8 encoded-large tiles 320 to generate a web page image 204 for the entirety of the web page area 200. In some embodiments, a fourth (I/O) memory space 328 (e.g., in persistent memory), which can be an additional portion of the total memory 311, can be allocated for storing the web page image 204. When the web page image 204 using encoded-large tiles 320 is generated and/or stored in the I/O memory space 328, the thread executing the tile output process 324 may release the portion of the third memory space 322 storing the encoded-large tiles 320 that were combined.

In some embodiments, a sequence can be determined before or during the tile output process 324 to retrieve some or all of the encoded-large tiles or to combine some or all of the encoded-large tiles to generate the web page image. The sequence can be implemented to generate from some or all of the encoded-large tiles at least a portion of a web page image 204 for some or all of the web page area 200.

In some embodiments, a tile output process 324 can be executed in a sequential-type order to avoid having to keep the entire web page image in memory. For example, data that is adjacent to still missing tiles can be kept in memory, and all other data can be used to generate the web page image. Further, an associated header of the output web page image can be updated to allow suitable decoding.

In some embodiments, a page display process 330 may provide for display of the web page image 204 on a display of the user device 104. For example, the page display process 330 may determine a portion of the web page area 200 corresponding to a viewport of the browser application 112, retrieve the web page image 204 from the I/O memory space 328, and cause at least a portion of the web page image 204 corresponding to a portion of the web page area 200 corresponding to a viewport of the browser to be displayed in the viewport of the browser application 112.

In some embodiments, a page display process 330 may also provide an output of an associated metadata file that contains one or more offsets of an output image file, wherein the offsets correspond to one or more coordinates in an originating web page or web page area. In this manner, a user can jump directly into a portion of the image file and decode only a portion of the image (for the visible display area of a user device). In certain embodiments, one or more offsets can be used for backwards partial decoding.

Figure 4:
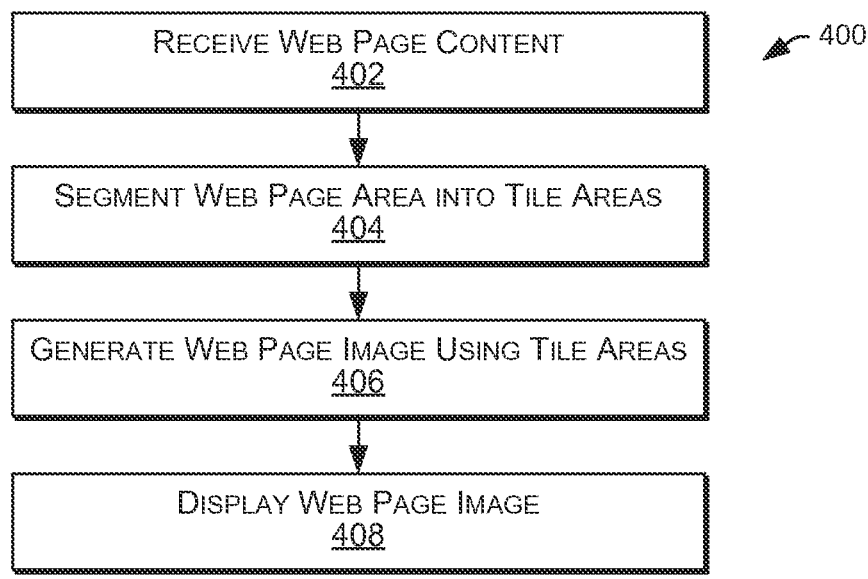
FIG. 4 is a flow diagram that illustrates an example method for displaying a web page in accordance with one or more embodiments.

FIG. 4 is a flow diagram that illustrates an example method for displaying a web page in accordance with one or more embodiments. In some embodiments, some or all of the operations of the method 400 can be performed by a user device (e.g., by a browser application 112 of the user device 104 in FIG. 1) and/or a web server (e.g., by the web content management module 120 of the web server 102 in FIG. 1).

The method 400 can include receiving web page content (block 402). In some embodiments, receiving web page content can include receiving web page content 110 from the web server 102. The web page content 110 may include content of a web page to be rendered for display on the user device 104 for viewing by the user 108. For example, the user 108 may navigate to a web page address using the browser application 112, the browser application 112 may send a corresponding request for web page content 110 for the web page to the web server 102, the web server 102 may retrieve the corresponding web page content 110 for the web page from the data store 130, and may serve the web page content 110 to the user device 104 and the browser application 112.

The method 400 can include segmenting a web page area into tile areas (block 404). In some embodiments, segmenting a web page area into tile areas can include segmenting a web page area 200 of the received web page content 110 into small tile areas 202 (see FIG. 2). For example, a web page area 200 can be segmented (or split) into multiple small tile areas 202. For example, as illustrated in FIG. 2, the web page area 200 is segmented into about 71 small tile areas 202. In an example embodiment, the web page area 200 may be about 10,000×16,000 pixels in size, and the small tile areas 202 may be of different shapes and sizes (e.g., 10×20 pixels, 20×20 pixels, 50×200 pixels, 5,000×4,000 pixels and/or the like).

Figure 5:
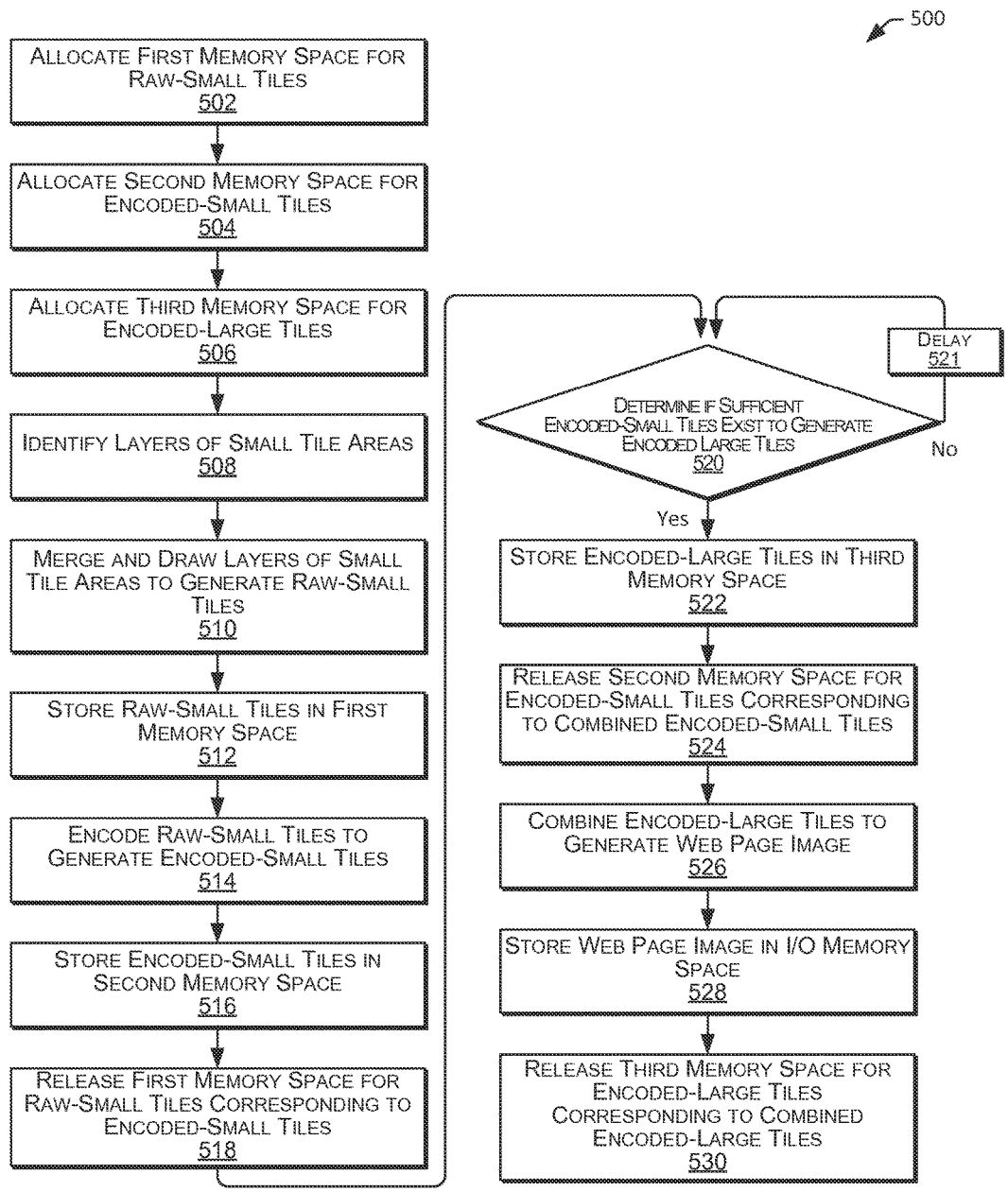
FIG. 5 is a flow diagram that illustrates an example method for generating a web page image using the tile areas in accordance with one or more embodiments.

The method 400 can include generating a web page image using the tile areas (block 406). In some embodiments, generating a web page image using the tile areas can include identifying layers of the web page content for each of the respective small tile areas, merging the layers of the respective small tile areas to generate corresponding raw-small tiles, encoding the raw-small tiles to generate corresponding encoded-small tiles, combining the encoded-small tiles of the respective large tile areas to generate encoded-large tiles, and/or combining one or more of the encoded-large tiles to generate a web page image. In some embodiments, generating a web page image using the tile areas can include allocating a first memory space for storing raw-small tiles, allocating a second memory space for storing encoded-small tiles, and/or allocating a third memory space for storing encoded-large tiles. FIG. 5 is a flow diagram that illustrates an example method 500 for generating a web page image using the tile areas in accordance with one or more embodiments.

The method 400 can include displaying a web page image (block 408). In some embodiments, displaying the web page image can include causing display of some or all of the web page image 204 on a display of the user device 104. For example, the browser application 112 may determine a portion of the web page area 200 corresponding to a viewport of the browser application 112, retrieve the web page image 204 from the I/O memory space 328, and cause at least a portion of the web page image 204 corresponding to a portion of the web page area 200 corresponding to a viewport of the browser to be displayed in the viewport of the browser application 112. In some embodiments, the method 400 can include displaying multiple images, corresponding to multiple separate layers and images.

FIG. 5 is a flow diagram that illustrates an example method 500 for generating a web page image using the tile areas in accordance with one or more embodiments. In some embodiments, some or all of the operations of the method 500 can be performed by a user device (e.g., by a browser application 112 of the user device 104 in FIG. 1) and/or a web server (e.g., by the web content management module 120 of the web server 102 in FIG. 1).

The method 500 can include allocating a first memory space for storing raw-small tiles (block 502), allocating a second memory space for storing encoded-small tiles (block 504), and/or allocating a third memory space for storing encoded-large tiles (block 506).

The method 500 can include identifying layers of the tile areas (block 508). In some embodiments, identifying layers of the tile areas can include identifying one or more image layers of the portion of the web page content 110 contained in each of the respective tile areas. For example, one or more small tile areas 202 can be selected (e.g., as described above with regard to the tile layer identification process 302), and for each of the selected small tile areas 202, background layers, transparent layers, layers of graphics, layer of text, and/or the like that are present in the small tile area 202 (e.g., that are contained in or at least overlap partially within the small tile area 202) can be identified, and/or an order thereof (e.g., which layer is the first (background layer), which layer is the next layer, and so forth until the last (foreground layer)) can be identified. In some embodiments, the tile layer identification process 302 can include processing some or all of the small tile areas 202 in parallel.

The method 500 can include merging and drawing layers of small tile areas to generate raw-small tiles (block 510), and storing the raw-small tiles in a first memory space (block 512). In some embodiments, merging and drawing layers of small tile areas to generate raw-small tiles can include merging and drawing the small tile layers 304 of the respective small tile areas 202 to generate corresponding raw-small tiles 308. This can include, for example, for each of the selected small tile areas 202, merging and drawing the layers identified as being present in the small tile area 202 to generate a corresponding raw-small tile 308. If, for example, a small tile area 202 includes a background layer (e.g., including a first graphic), an intermediate layer (e.g., including a second graphic), and a foreground layer (e.g., including text), then the three layers can be merged and drawn to generate a corresponding raw-small tile 308 that includes the second graphic overlaid on top of the first graphic and the text overlaid on the first and second graphics. In some embodiments, the raw-small tiles 308 can be stored in the first memory space 310 as they are generated. In some embodiments, the tile layer merging process 306 can include processing some or all of the small tile areas 202 in parallel. For example, 20 threads handling the receptive tile layer merging process 306 for the 20 small tile areas 202 can be executed in parallel. When a thread completes the merging and drawing of the small tile layers 304 to generate a raw-small tile 308 corresponding to the small tile area 202, it may store the raw-small tile 308 in the first memory space 310 and, then, proceed with executing a tile layer merging process 306 for another small tile area 202 (e.g., the first of the 20 threads to complete may proceed with processing the $21^{st}$ small tile area 202, the second of the 20 threads to complete may proceed with processing the $22^{nd}$ small tile area 202, and so forth).

The method 500 can include encoding raw-small tiles to generate encoded-small tiles (block 514), storing the encoded-small tiles in a second memory space (block 516), and releasing the first memory space for the raw-small tiles corresponding to the encoded-small tiles (block 518). In some embodiments, encoding raw-small tiles to generate encoded-small tiles can include encoding the raw-small tiles 308 to generate corresponding encoded-small tiles 314. This can include, for example, for each of the raw-small tiles 308, executing an encoding algorithm to generate a corresponding encoded-small tile 314. In some embodiments, the encoded-small tiles 314 can be stored in the second memory space 316 as they are generated. In some embodiments, the tile encoding process 312 can include processing some or all of the raw-small tiles 308 in parallel. For example, 15 threads handling the receptive tile layer merging process 306 for the raw-small tiles 308 stored in first memory space 310 can be executed in parallel. Each thread may retrieve a raw-small tile 308 from the first memory space 310, encode the raw-small tile 308 to generate an encoded-small tile 314 corresponding to the raw-small tile 308 (and a corresponding small tile area 202), store the encoded-small tile 314 in the second memory space 316, release the portion of the first memory space 310 storing the raw-small tile 308 and, then, proceed with executing a tile encoding process 312 for another raw-small tile 308 stored in the first memory space 310 (e.g., the first of the 15 threads to complete may proceed with processing the $16^{th}$ raw-small tile 308 stored in the first memory space 310, the second of the 15 threads to complete may proceed with processing the $17^{th}$ raw-small tile 308 stored in the first memory space 310, and so forth).

The method 500 can include determining if sufficient encoded-small tiles exist to generate encoded-large tiles (block 520), if not, delaying processing until more encoded-small tiles are generated (block 521), and if a sufficient number exists, storing the encoded-large tiles in a third memory space (block 522), and releasing the second memory space for the encoded-small tiles corresponding to the combined encoded-small tiles (block 524). In some embodiments, determining if sufficient encoded-small tiles exist to generate encoded-large tiles can include determining if a sufficient number of one or more of the encoded-small tiles 314 have been generated, and waiting until a sufficient number of the encoded-small tiles 314 exist to generate corresponding encoded-large tiles 320. This can include, for example, for the web page area 200, identifying some or all of the encoded-small tiles 314 stored in the second memory space 316 that are contained in the web page area 200, and executing combining process 318 to combine the identified encoded-small tiles 314 to generate some or all of a corresponding encoded-large tile 320 for the web page area 200. In some embodiments, the encoded-large tiles 320 can be stored in the second memory space 316 as they are generated. In some embodiments, the tile combining process 318 can include combining encoded-small tiles 314 for some or all of the encoded-large tiles 320 in parallel. For example, 4 threads handling the tile combining processes can be executed in parallel. Each thread may retrieve encoded-small tiles 314 corresponding to a small tile area 202 that falls within the web page area 200 from the first memory space 310, if a sufficient number of encoded-small tiles 314 exist, then combine the encoded-small tiles 314 to generate an encoded-large tile 320 corresponding a portion of the web page area 200, store the encoded-large tile 320 in the third memory space 322, release the portion of the second memory space 316 storing the encoded-small tiles 314 that were combined and, then, proceed with executing a tile combining process 318 for another portion of the web page area 200 (e.g., the first of the 4 threads to complete may proceed with processing to combine the encoded-small tiles 314 for a portion of the web page area 200, the second of the 4 threads to complete may proceed with processing to combine the encoded-small tiles 314 for another portion of the web page area 200, and so forth). In some embodiments, a sufficient number of encoded-small tiles 314 may not yet exist at block 520, and a delay or loop at block 521 may be implemented to provide additional time for additional encoded-small tiles 314 to be generated.

The method 500 can include combining encoded-large tiles to generate a web page image (block 526), storing the web page image in the I/O memory space (block 528), and releasing the third memory space for the encoded-large tiles corresponding to the combined encoded-large tiles (block 530). In some embodiments, combining encoded-large tiles to generate a web page image can include combining one or more of the encoded-large tiles 320 to generate at least a portion of a web page image 204 for some or all of the web page area 200. This can include, for example, when some or all of the encoded-large tiles 320 for the web page area 200 are complete, combining some or all of the completed encoded-large tiles 320 to generate an image for the corresponding portions of the web page area 200. For example, if the 8 encoded-large tiles 320 for the 8 large tile areas 206 of the web page area 200 are completed (see FIG. 2), a thread may combine the 8 encoded-large tiles 320 to generate a web page image 204 for the entirety of the web page area 200. In some embodiments, a fourth (I/O) memory space 328 (e.g., in persistent memory) can be allocated for storing the web page image 204. When the web page image 204 using encoded-large tiles 320 is generated and/or stored in the I/O memory space, the thread executing the tile output process 324 may release the portion of the third memory space 322 storing the encoded-large tiles 320 that were combined. As described herein, the resulting web page image 204 can be displayed (e.g., see block 408 of FIG. 4).

In some embodiments, a set of one or more instructions can be generated to facilitate output of at least a portion of the image. The instructions can include one or more of the following: an instruction to rasterize a web page image, an instruction to output a web page image to a display device, and/or an instruction to prepare a web page image to be output, such as output of the web page image to a display device. In this manner, the set of one or more instructions can be used by a different entity, such as computing resource or graphics processor, to output at least a portion of the web page image to a display device of a user device.

It will be appreciated that the processes and methods described herein are example embodiments of processes and methods that may be employed in accordance with the techniques described herein. The processes and methods may be modified to facilitate variations of their implementation and use. The order of the processes, the methods, and the operations provided therein may be changed, and various elements may be added, reordered, combined, omitted, modified, etc. Portions of the processes and methods may be implemented in software, hardware, or a combination thereof. Some or all of the portions of the processes and methods may be implemented by one or more of the processors/modules/applications described herein.

Figure 6:
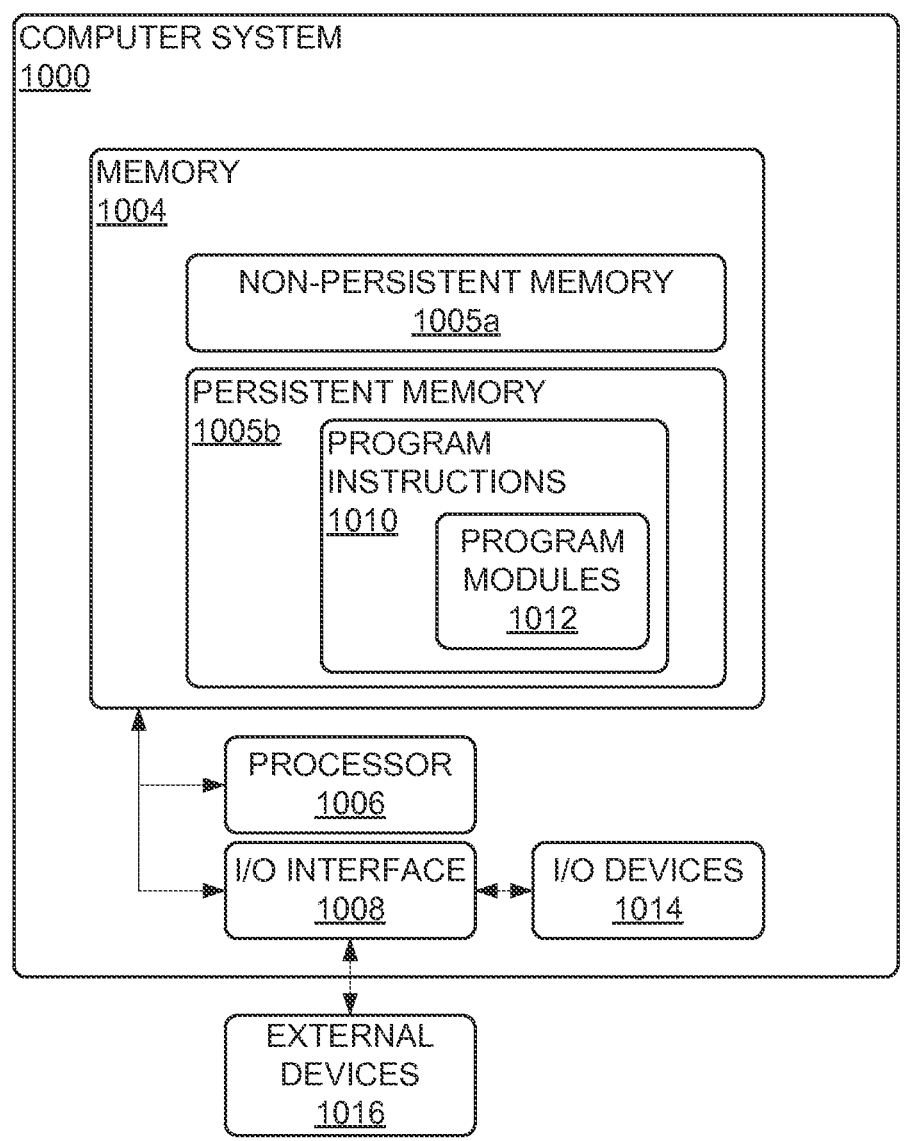
FIG. 6 is a diagram that illustrates an example computer system in accordance with one or more embodiments.

FIG. 6 is a diagram that illustrates an example computer system 1000 in accordance with one or more embodiments. In some embodiments, the computer system 1000 may include a memory 1004, a processor 1006, and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), bulk storage memory (e.g., CD-ROM and/or DVD-ROM, hard drives), and/or the like. The memory 1004 may include a non-transitory computer-readable storage medium having program instructions 1010 stored therein. The memory may include non-persistent memory 1005a (e.g., DRAM and/or the like) and/or persistent memory 1005b (e.g., a hard drive and/or the like). In some embodiments, the memory 1004 can include all persistent memory. In other embodiments, the memory 1004 may include all non-persistent memory. In certain embodiments, the memory 1004 can include fast-type and/or slow-type memory. The program instructions 1010 may include program modules 1012 that are executable by a computer processor (e.g., the processor 1006) to cause the functional operations described herein, including those described with regard to the process 300 and the methods 400 and 500. In the context of a computer system of a user device 104, the program modules 1012 may include one or more user device modules (e.g., a web browser application 112) for performing some or all of the operations described with regard to a user device 104. In the context of a computer system of a web server 102, the program modules 1012 may include one or more user device modules (e.g., a web content management module 120) for performing some or all of the operations described with regard to a web server 102.

The processor 1006 may be any suitable processor capable of executing/performing program instructions. The processor 1006 may include a central processing unit (CPU) that carries out program instructions (e.g., the program instructions of the program module(s) 1012) to perform the arithmetical, logical, and input/output operations described herein. The processor 1006 may include one or more processors. The I/O interface 1008 may provide an interface for communication with one or more I/O devices 1014, such as a joystick, a computer mouse, a keyboard, a display screen (e.g., an electronic display for displaying a graphical user interface (GUI)), and/or the like. The I/O devices 1014 may include one or more of the user input devices. The I/O devices 1014 may be connected to the I/O interface 1008 via a wired or a wireless connection. The I/O interface 1008 may provide an interface for communication with one or more external devices 1016, such as other computers, networks, and/or the like. In some embodiments, the I/O interface 1008 may include an antenna, a transceiver, and/or the like.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. As used throughout this application, the term "from" does not limit the associated operation to being directly from. Thus, for example, receiving an item "from" an entity may include receiving an item directly from the entity or indirectly from the entity (e.g., via an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic, or magnetic quantities within memories, registers, or other information storage devices, transmission devices, or display devices of the special purpose computer or similar special purpose electronic processing/computing device.

What is claimed is:

1. A method for displaying a web page, the method comprising:
   receiving, by one or more processors, web page content to be rendered for display in a web browser;
   segmenting, by the one or more processors, the web page content comprising:
      segmenting the web page content into at least a first small tile area, a second small tile area, a third small tile area, and a fourth small tile area;
   identifying, by the one or more processors, one or more image layers of the web page content for the respective small tile areas;
   allocating, by the one or more processors, memory comprising:
      allocating a first memory space for storing raw-small tiles;
      allocating a second memory space for storing encoded-small tiles; and
      allocating a third memory space for storing encoded-large tiles;
   generating, by the one or more processors, raw-small tiles comprising:
      merging the one or more image layers of the respective small tile areas to generate respective, first, second, third and fourth raw-small tiles; and
      storing the first, the second, the third and the fourth raw-small tiles in the first memory space;
   generating, by the one or more processors, encoded-small tiles comprising:
      retrieving the first, the second, the third and the fourth raw-small tiles from the first memory space;
      encoding the first, the second, the third and the fourth raw-small tiles to generate respective first, second, third and fourth encoded-small tiles;
      storing the first, the second, the third and the fourth encoded-small tiles in the second memory space; and
      releasing the portion of the first memory space storing the first, the second, the third and the fourth raw-small tiles;
   generating, by the one or more processors, encoded-large tiles comprising:
      retrieving the first, the second, the third and the fourth encoded-small tiles from the second memory space;
      combining the first and the second encoded-small tiles to generate a first encoded-large tile, wherein the combining is based at least in part on the first and the second encoded-small tiles reaching a first threshold number of encoded-small tiles;
      combining the third and the fourth encoded-small tiles to generate a second encoded-large tile, wherein the combining is based at least in part on the third and the fourth encoded-small tiles reaching the first threshold number of encoded-small tiles;
      storing the first and the second encoded-large tiles in the third memory space; and
      releasing, based on reaching a second threshold number of encoded-small tiles, the portion of the second memory space storing the first, the second, the third and the fourth encoded-small tiles;
   generating, by the one or more processors, a web page image comprising:
      retrieving the first and the second encoded-large tiles from the third memory space;
      combining the first and the second encoded-large tiles to generate the web page image;
      storing the web page image in an input/output (I/O) memory space;
      releasing the portion of the third memory space storing the first and the second encoded-large tiles;
   receiving, by the one or more processors, a request to display at least a portion of the web page;

retrieving, by the one or more processors, the web page image from the I/O memory space; and causing, by the one or more processors, display of the at least a portion of the web page image corresponding to the at least a portion of the web page.

2. The method of claim 1, wherein the first, the second and the third memory spaces comprise non-persistent memory of a computer device, and wherein the I/O memory space comprises persistent memory of the computer device.

3. The method of claim 1, wherein generating, by the one or more processors, a web page image further comprises:
determining a sequence for retrieving three or more encoded-large tiles from the third memory space or for combining the three or more encoded-large tiles to generate the web page image; and
using the sequence to retrieve three or more encoded-large tiles from the third memory space or to combine the three or more encoded-large tiles to generate the web page image.

4. The method of claim 1, wherein segmenting the web page content, generating the raw-small tiles, generating the encoded-small tiles, generating the encoded-large tiles, and generating the web page image are executed at least partially in parallel by two or more process threads executed by the one or more processors.

5. A method, comprising:
receiving, by one or more processors, web content comprising an area to be displayed;
segmenting, by the one or more processors, the area into tile areas;
generating, by the one or more processors, raw tiles corresponding to the tile areas;
storing, by the one or more processors, the raw tiles in a first memory space allocated for storing raw tiles;
encoding, by the one or more processors, the raw tiles to generate encoded tiles corresponding to the tile areas;
storing, by the one or more processors, the encoded tiles in a second memory space allocated for storing encoded tiles;
releasing, by the one or more processors, the portion of the memory space storing the raw tiles;
combining, by the one or more processors, a first number of encoded tiles to generate combined tiles, wherein the combining is based at least in part on the first number reaching a threshold of encoded tiles;
storing, by the one or more processors, the combined tiles in a third memory space allocated for storing combined tiles;
releasing, by the one or more processors, based on reaching a threshold for a second number of encoded tiles, the portion of the second memory space storing the encoded tiles;
combining, by the one or more processors, two or more of the combined tiles to generate an image;
storing, by the one or more processors, the image in a fourth memory space; and
releasing, by the one or more processors, the portion of the third memory space storing the combined tiles.

6. The method of claim 5, further comprising:
generating one or more instructions to facilitate output of at least a portion of the image.

7. The method of claim 5, further comprising:
allocating the first, the second and the third memory spaces,
wherein allocating the second memory space comprises determining a size of the second memory space based at least in part on the size of the first memory space.

8. The method of claim 7, wherein allocating the second memory space comprises determining a size of the second memory space based at least in part on a predetermined ratio of the size of the first memory space to the size of the second memory space.

9. The method of claim 5, wherein the second memory space is smaller than the first memory space.

10. The method of claim 5, wherein the first, the second and the third memory spaces comprise non-persistent memory of a computer device, and wherein the fourth memory space comprises persistent memory of the computer device.

11. The method of claim 5, wherein the first, the second and the third memory spaces comprise volatile memory of a computer device, and wherein the fourth memory space comprises non-volatile memory of a file system of the computer device.

12. The method of claim 5, wherein generating the raw tiles corresponding to the tile areas comprises merging image layers of the tile areas.

13. The method of claim 5, further comprising:
determining an image size corresponding to an encoding process used to encode the raw tiles,
wherein segmenting the image into the tile areas comprises segmenting the image into tile areas that are increments of the image size.

14. The method of claim 5, further comprising at least one of:
storing one or more raw tiles in the first memory space released;
storing one or more encoded tiles in the second memory space released; or
storing one or more combined tiles in the third memory space released.

15. The method of claim 5, further comprising:
retrieving at least a portion of the image from the fourth memory space; and
causing display of at least the portion of the image.

16. The method of claim 5, wherein the size of the tile areas is determined based on content at least partially contained in the tile area.

17. A system, comprising:
a processor; and
a memory comprising program instructions stored thereon that are executable by the processor to cause:
receiving web content comprising an area to be displayed;
segmenting the area into tile areas;
generating raw tiles corresponding to the tile areas;
storing the raw tiles in a first memory space allocated for storing raw tiles;
encoding the raw tiles to generate encoded tiles corresponding to the tile areas;
storing the encoded tiles in a second memory space allocated for storing encoded tiles;
combining a first number of encoded tiles to generate combined tiles, wherein the combining is based at least in part on the first number reaching a threshold of encoded tiles;
storing the combined tiles in a third memory space allocated for storing combined tiles;
releasing the second memory space based on reaching a threshold for a second number of encoded tiles;
combining two or more of the combined tiles to generate an image; and
storing the image in a fourth memory space.

18. The system of claim 17, wherein the program instructions are further executable by the processor to cause:
   releasing the portion of the first memory space storing the raw tiles; and
   releasing the portion of the third memory space storing the combined tiles.

19. The system of claim 18, wherein the program instructions are further executable by the processor to cause:
   reusing at least a released portion of at least one of the first memory space, the second memory space, or the third memory space when storing any of the encoded tiles, the combined tiles, or the image.

20. The system of claim 18, wherein the program instructions are further executable by the processor to cause:
   delaying the releasing of at least one of the first memory space, the second memory space, or the third memory space.

21. The system of claim 17, wherein the program instructions are further executable by the processor to cause:
   allocating the first, the second and the third memory spaces,
   wherein allocating the second memory space comprises determining a size of the second memory space based at least in part on the size of the first memory space.

22. The system of claim 17, wherein the first, the second and the third memory spaces comprise non-persistent memory of a computer device, and wherein the fourth memory space comprises persistent memory of the computer device.

23. The system of claim 17, wherein the program instructions are further executable by the processor to cause:
   determining an image size corresponding to an encoding process used to encode the raw tiles,
   wherein segmenting the image into the tile areas comprises segmenting the image into tile areas that are increments of the image size.

24. The system of claim 17, wherein the program instructions are further executable by the processor to cause:
   retrieving at least a portion of the image from the fourth memory space; and
   causing display of at least the portion of the image.

* * * * *